(12) United States Patent
Morikawa

(10) Patent No.: US 6,246,836 B1
(45) Date of Patent: Jun. 12, 2001

(54) CAMERA

(75) Inventor: Goichi Morikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/426,029

(22) Filed: Oct. 25, 1999

(30) Foreign Application Priority Data

Oct. 30, 1998 (JP) ................................ 10-324437

(51) Int. Cl.[7] ................................................ G03B 7/08
(52) U.S. Cl. .................................................... 396/222
(58) Field of Search ........................................ 396/222

(56) References Cited

U.S. PATENT DOCUMENTS

| | | | |
|---|---|---|---|
| 4,734,727 | 3/1988 | Takemae | 354/412 |
| 4,862,205 | 8/1989 | Kawamura | 354/412 |
| 5,253,009 | 10/1993 | Satou et al. | 354/412 |
| 5,508,779 | 4/1996 | Satou et al. | 354/410 |
| 5,543,872 | * 8/1996 | Goto et al. | 396/222 |

OTHER PUBLICATIONS

Patent Abstracts of Japan No. JP 63 037332 A, published Feb. 18, 1988, vol. 12, No. 245.

* cited by examiner

Primary Examiner—W. B. Perkey
(74) Attorney, Agent, or Firm—Robin, Blecker & Daley

(57) ABSTRACT

In a camera capable of setting an auto-bracketing photo-taking mode of photographing on a plurality of frames of a film continuously with a photo-taking exposure value changed automatically and stepwise, when the auto-bracketing photo-taking mode is set, photographing is performed with a predetermined standard exposure value on both of a start frame and an end frame of a continuous photo-taking in the auto-bracketing photo-taking mode, and photographing is performed with an exposure value different from the predetermined standard exposure value on a frame between the start frame and the end frame, so that the start frame and the end frame of the continuous photo-taking in the auto-bracketing photo-taking mode can be made to be photo-taking frames with the same exposure condition.

10 Claims, 7 Drawing Sheets

CAMERA

BACKGROUND OF THE INVENTION

1. Field of the Invention

The present invention relates to a camera having an auto-bracketing photo-taking mode, capable of photographing on a plurality of frames of a film continuously with the photo-taking exposure value changed automatically and stepwise.

2. Description of Related Art

Conventionally, an auto-bracketing photo-taking mode of photographing on a plurality of frames of a film with the exposure value changed automatically has been used as a method for an automatic exposure control of a camera. According to the auto-bracketing photo-taking mode, in addition to photographs with the correct exposure, photographs intentionally with underexposure and overexposure can be obtained automatically and continuously.

Recently, a film having a magnetic recording part has been available on the market. With a camera having a magnetic recording means for recording information on the magnetic recording part, various kinds of information concerning the photo-taking frames can be recorded on the film. According to the camera of this kind, which has a plurality of selective photo-taking modes capable of recording information selectively from plural kinds of information, or recording plural kinds of information at the same time, in a case where a specific photo-taking mode (the above-mentioned auto-bracketing photo-taking mode) is selected by a mode selecting means, information of commanding printing with the same condition (the same exposure amount and the same color filter are set) at the time of printing can be recorded with respect to each of the magnetic recording parts of a plurality of frames taken continuously according to the specific photo-taking mode by the magnetic recording means. The continuous photo-taking scenes having the information of commanding printing with the same condition are called "series scene".

That is, the series scene stands for a series of photo-taking scenes to be printed with the same condition for accurately reproducing the exposure state at the time of photographing by prohibiting printing of the photo-taking frames with respective different exposures by an automatic printing photofinishing system. Therefore, information indicative of the series scene is recorded in the magnetic recording part of each photo-taking frame of the film, so that the plurality of frames with that information recorded can be printed with the same printing condition at the time of printing the film so as to obtain photographs as the photographer intended to have. This technique is disclosed in U.S. Pat. No. 5,027,140, etc.

When the film having frames taken as the series scene as mentioned above is presented to a photofinishing laboratory for having photographs, even in a case where the automatic printing photofinishing system for executing printing exposure control automatically so as to have the correct exposure value for each frame taken ordinarily is used, since the magnetic recording part of the film has the series scene information recorded therein, the automatic printing photofinishing system reads the series scene information and processes the printing with the exposure amount and the color determination condition fixed, with respect to a plurality of continuous frames with the series scene set.

Therefore, by recording information indicative of the series scene in the magnetic recording part of each of a series of photo-taking frames with intentional exposure shift taken with the auto-bracketing photo-taking mode, the film can be printed with the exposure intended by the photographer even in the case of the printing with the automatic printing photofinishing system.

The information recorded on the magnetic recording parts of a plurality of frames taken continuously in the auto-bracketing photo-taking mode as the series scene does not include information indicative of which frame is of the correct exposure, or which frame is of the overexposure or the underexposure, but includes information indicating that each frame is a start frame, an end frame or an intermediate frame of the series scene. For example, in a case where a film in which the auto-bracketing photo-taking was performed in the order of the correct exposure, the underexposure and the overexposure is printed by the automatic printing photofinishing system in the same order, since the start frame of the series scene is taken with the correct exposure, the automatic printing photofinishing system gives the correct exposure value to this frame and prints the frames included in the series scene with the same condition, so that the prints with the exposure shift intended by the photographer can be obtained.

However, there are various kinds of automatic printing photofinishing systems and the order of developing a film varies depending on the kind of the automatic printing photofinishing system. Therefore, in a case where the automatic printing photofinishing system does not print in the same order, that is, in a case where the automatic printing photofinishing system prints in the reverse order, the printing operation is executed from the end frame of the series scene, so that the exposure value is given such that the end frame has the correct exposure, and thus the series of the plurality of frames taken in the auto-bracketing photo-taking is printed with the exposure value different from the value intended by the photographer. In the case of a positive film with a narrow latitude, the exposure value cannot be made drastically different from that intended by the photographer due to the automatic exposure amount adjustment by the automatic printing photofinishing system, so that the above-mentioned phenomenon is not problematic for the photographer. However, in the case of a negative film with a wide latitude, since the exposure value in the printing step poses a great influence on the final printing finish, the abovementioned phenomenon is manifest remarkably.

BRIEF SUMMARY OF THE INVENTION

It is an object of the invention to provide a camera and a photographing apparatus capable of giving prints with an exposure changed stepwise as intended by a photographer, regardless of the kind of an automatic printing photofinishing system, even in a case where the film used in the auto-bracketing photo-taking mode is a negative film.

To attain the above object, in accordance with one aspect of the invention, there is provided a camera comprising photo-taking mode setting means for setting one of photo-taking modes of the camera, the photo-taking modes including an auto-bracketing photo-taking mode of photographing on a plurality of frames of a film continuously with a photo-taking exposure value changed automatically and stepwise, and photo-taking control means for, when the auto-bracketing photo-taking mode is set by the photo-taking mode setting means, photographing with a predetermined standard exposure value on both of a start frame and an end frame of a continuous photo-taking in the auto-bracketing photo-taking mode, and photographing with an exposure value different from the predetermined standard exposure value on a frame between the start frame and the end frame, so that the start frame and the end frame of the continuous photo-taking in the auto-bracketing photo-taking mode can be made to be photo-taking frames with the same exposure condition.

The above and further objects and features of the invention will become apparent from the following detailed description of a preferred embodiment thereof taken in conjunction with the accompanying drawings.

DETAILED DESCRIPTION OF THE INVENTION

Hereinafter, a preferable embodiment of the invention will be described in detail with reference to the drawings.

Figure 1:
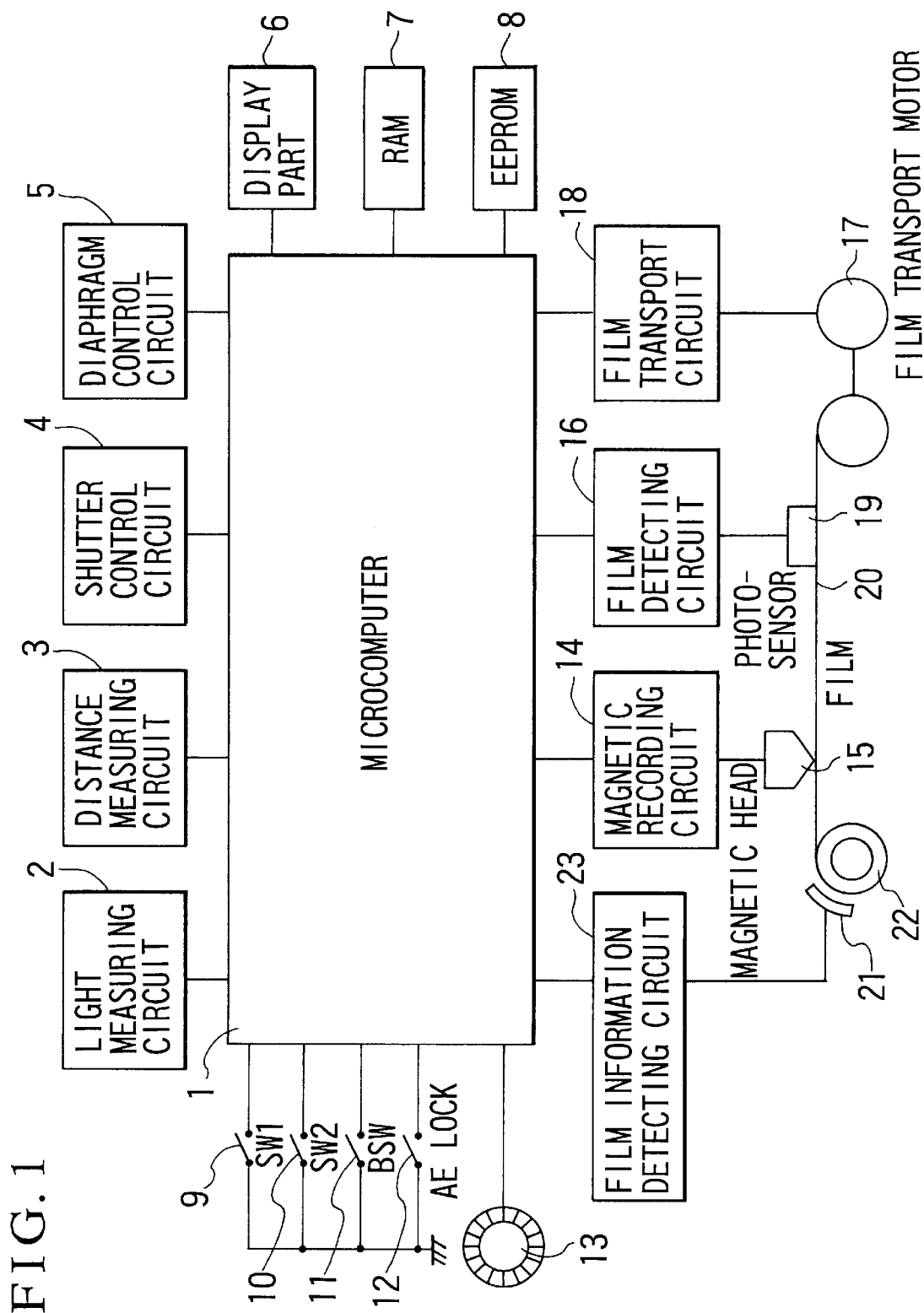
FIG. 1 is a block diagram showing the circuit arrangement of a camera according to an embodiment of the invention.

FIG. 1 is a block diagram showing the circuit arrangement of a camera according to the embodiment of the invention. The arrangement of each part of the camera will be first described.

In FIG. 1, reference numeral 1 denotes a microcomputer serving as a control device for controlling the entirety of the camera, reference numeral 2 denotes a light measuring circuit for obtaining measured light information used for the decision of the exposure amount, reference numeral 3 denotes a distance measuring circuit for detecting the focal position so as to move a photo-taking lens to the focal position, reference numeral 4 denotes a shutter control circuit for controlling opening/closing of the shutter, and reference numeral 5 denotes a diaphragm control circuit for controlling the aperture amount of the diaphragm of the lens. Reference numeral 6 denotes a display part provided outside the camera or inside the viewfinder for indicating various kinds of information such as the shutter speed and the aperture value. In a case where the series scene is set, information indicative of the series scene is displayed on the display part 6.

Reference numeral 7 denotes a RAM serving as an external memory means, reference numeral 8 denotes an EEPROM serving as a nonvolatile external memory means, reference numeral 9 denotes a light-measuring and distance-measuring switch for starting measuring the light and distance (hereinafter referred to as the switch SW1), reference numeral 10 denotes a release switch for starting the shutter release operation (hereinafter referred to as the switch SW2), and reference numeral 11 denotes an auto-bracketing setting switch for setting the auto-bracketing photo-taking mode (hereinafter referred to as the switch BSW). Reference numeral 12 denotes an AE lock switch. Based on the measure light value obtained at the time when the AE lock switch 12 is pressed, the exposure value is decided. Reference numeral 13 denotes a setting dial for setting the automatic exposure shift amount of the auto-bracketing photo-taking by rotating the setting dial 13 with the switch BSW turned on, reference numeral 14 denotes a magnetic recording circuit for controlling a magnetic head 15 for writing photo-taking information on a film having a magnetic recording part, reference numeral 16 denotes a film detecting circuit for detecting the transport speed of the film and the position of the film according to a signal from a photo-sensor 19, reference numeral 18 denotes a film transport circuit for controlling a film transport motor 17 for transporting the film, reference numeral 20 denotes a film having a magnetic recording part, reference numeral 21 denotes a photo-sensor for reading out the film data from a data disk 22 provided at the film cartridge when the film cartridge is loaded in the camera, and reference numeral 23 denotes a film information detecting circuit for converting the output obtained from the photo-sensor 21 into information such as the kind and the sensitivity of the film.

Figure 2:
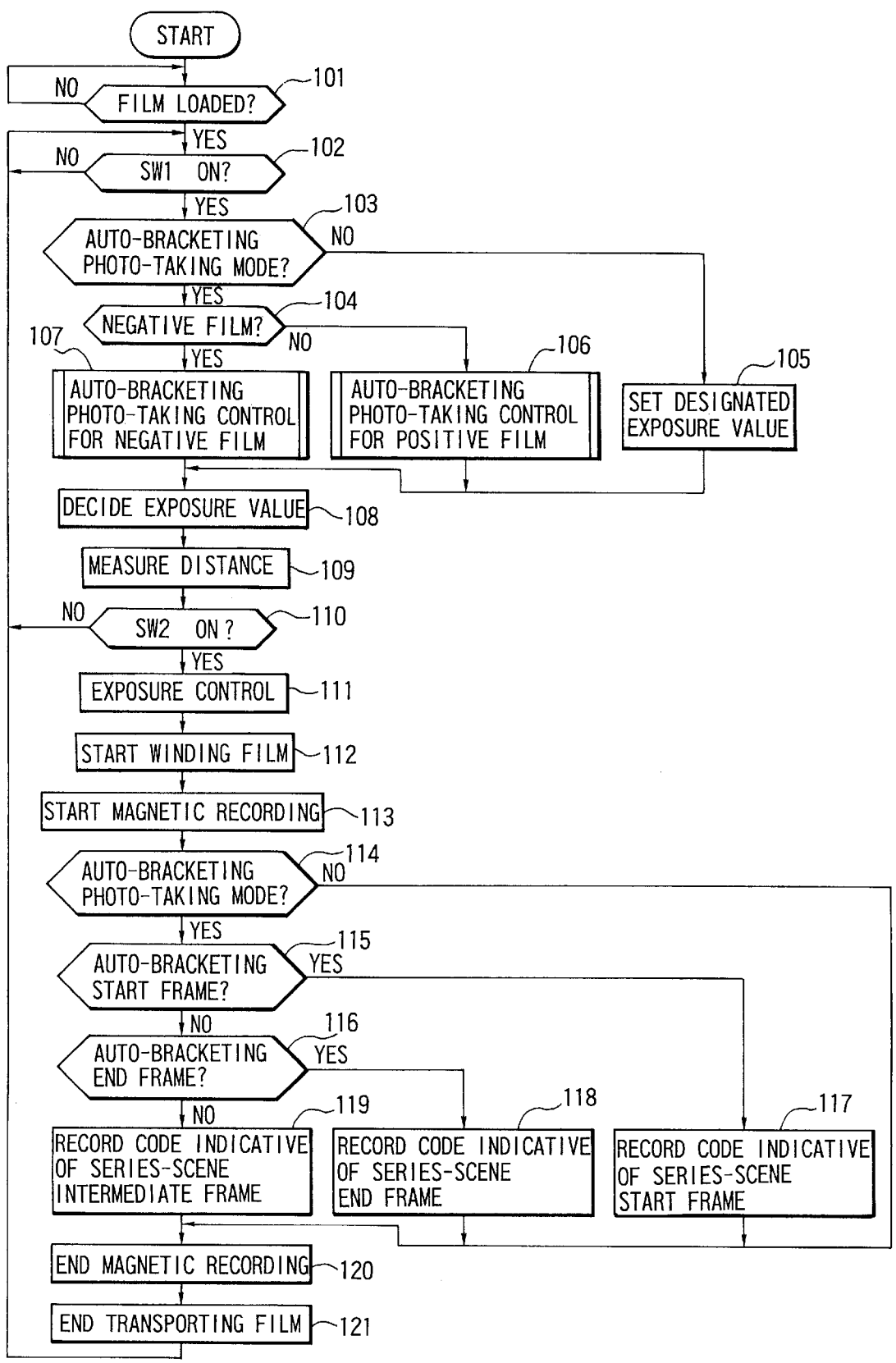
FIG. 2 is a flow chart showing the entire operation of the camera according to the embodiment of the invention.

FIG. 2 is a flow chart showing the operation of the microcomputer 1 shown in FIG. 1. With reference to the flow chart of FIG. 2, the entire operation of the camera will be explained.

When the main switch (not shown) is turned on, the microcomputer 1 starts the operation at a step 101.

In the step 101, whether of not the film 20 is loaded in the camera is detected. If the film 20 is loaded, the photographing operation of a step 102 and thereafter is executed. If the film 20 is not loaded, the photo-taking operation is prohibited so as to wait at this step until the film 20 is loaded. In the next step 102, whether or not the switch SW1 is on is judged. If the switch SW1 is on, the flow proceeds to a step 103 for starting measurement of the light and the distance. If the switch SW1 is not on, the flow returns to the step 102 so as to wait until the switch SW1 is turned on.

In the next step 103, whether or not the auto-bracketing photo-taking mode is set by the switch BSW and the setting dial 13. If the auto-bracketing photo-taking mode is set, the flow proceeds to a step 104. If the auto-bracketing photo-taking mode is not set, the flow proceeds to a step 105. A method for setting the exposure value shift will be explained later. In a case where the flow proceeds to the step 105, since the camera is a normal photo-taking mode for only one frame, the exposure value designated by the photographer will be set.

In the step 104, whether the loaded film is a negative film or a positive film is judged. If the loaded film is a negative film, a subroutine step 107 to be described later is executed. If the loaded film is judged to be a positive film, a subroutine step 106 to be described later is executed.

In the next step 108, the shutter speed and the aperture value are set so as to determine the exposure value based on the designated exposure value in the step 105 and the exposure shift amount in the subroutine step 107 or 106, and then, the flow proceeds to a step 109. In the step 109, the distance measuring operation is executed by the distance measuring circuit 3. By moving a lens (not shown), an object is brought into focus. In the subsequent step 110, whether or not the switch SW2 is on is judged. If the switch SW2 is not on, the flow returns to the step 102 so as to repeat the same operation. If the switch SW2 is on, the flow proceeds to a step 111 for executing an exposure operation. That is, the diaphragm of the lens is stopped at the value determined in the step 108 by driving the diaphragm control circuit 5, the exposing operation is executed by controlling the shutter (not shown) at the shutter speed determined in step 108 by driving the shutter control circuit 4, and the diaphragm (not shown) is released into the open state by driving the diaphragm control circuit 5 so as to finish the exposing operation. Then, the flow proceeds to a step 112.

In the step 112, the operation of winding up the film 20 by driving the film transport motor 17 via the film transport circuit 18 is started. In the next step 113, recording of the photo-taking data such as the date on the magnetic recording part of the film 20 is started by the magnetic head 15 by driving the magnetic recording circuit 14. In a step 114, whether or not the photo-taking mode is the auto-bracketing photo-taking mode is judged. If the photo-taking mode is the auto-bracketing photo-taking mode, the flow proceeds to a step 115. If the photo-taking mode is not the auto-bracketing photo-taking mode, the flow proceeds to a step 120 directly.

The operation from the step 115 to a step 119 is a series of the work for recording a series-scene command code for commanding the printing with the same condition (the same exposure amount and the same color determination condition) in the magnetic recording part of the film 20.

If, in the step 115, the present frame is judged to be the frame from which the auto-bracketing photo-taking is started, the flow proceeds to a step 117 so as to write a code indicative of the series-scene start frame in the magnetic recording part of that frame. Moreover, if, in the step 116, the present frame is judged to be the frame at which the auto-bracketing photo-taking is ended, the flow proceeds to a step 118 so as to write a code indicative of the series-scene end frame in the magnetic recording part of that frame. If the present frame is judged to be "NO" in both of the steps 115 and 116, the flow proceeds to the step 119 so as to write a code indicative of the series-scene intermediate frame in the magnetic recording part of that frame. In the next step 120, all the magnetic recording data to be recorded are recorded in the film 20. After finishing the recording, the flow proceeds to a step 121. In the step 121, when it is detected by the film detecting circuit 16 and the photo-sensor 19 that the film 20 has been transported by one frame to reach a predetermined position, the film transport motor 17 is stopped via the film transport circuit 18 so as to finish the release operation. Then, the flow returns to the step 102 to wait for the next release operation.

The subroutine step 107 in FIG. 2 will be explained with reference to the flow chart of FIG. 3. This step is a subroutine to be executed when the film is judged to be a negative film in the step 104 of FIG. 2.

Figure 3:
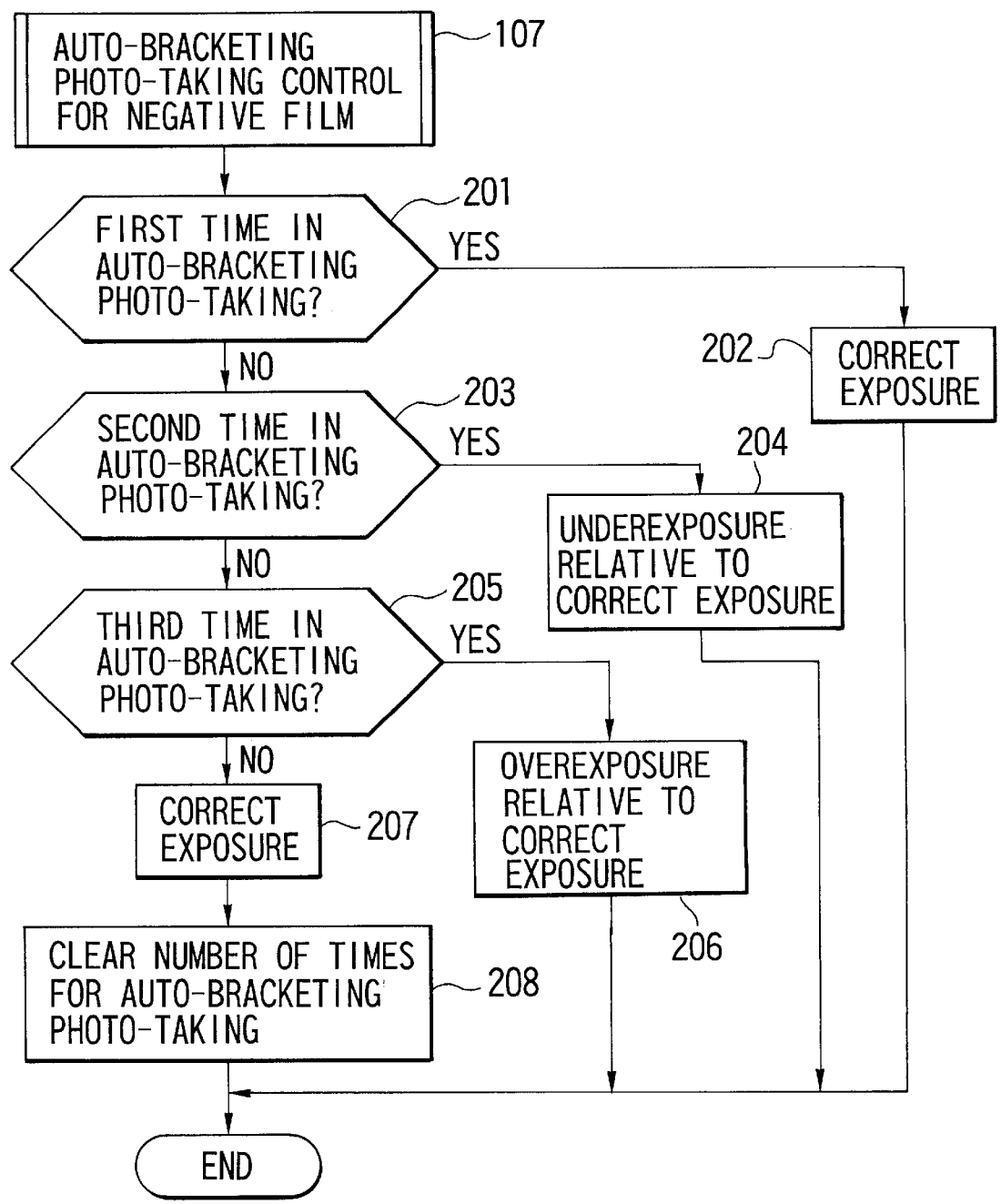
FIG. 3 is a flow chart showing the details of the operation executed in a step 107 shown in FIG. 2.

In a step 201 of FIG. 3, whether or not the present frame is the first frame after starting the auto-bracketing photo-taking is judged. If the present frame is the first frame, the flow proceeds to a step 202 so as to set the correct exposure value obtained based on the light measurement result obtained in the step 105. If not, the flow proceeds to a step 203, where whether or not the present frame is the second frame after starting the auto-bracketing photo-taking is judged. If the present frame is the second frame, the flow proceeds to a step 204 so as to set an underexposure value according to an exposure shift amount set by the setting of the auto-bracketing photo-taking mode to be later described.

Moreover, if, in the next step 205, the present frame is judged to be the third frame after starting the auto-bracketing photo-taking, the flow proceeds to a step 206 so as to set an overexposure value according to the set exposure shift amount. The correct exposure value described in the explanation hereinafter is the one obtained based on the light measurement result in the same manner.

If, in the step 205, the present frame is judged to be the fourth frame after starting the auto-bracketing photo-taking, the flow proceeds to a step 207 so as to set the correct exposure value, and further, the flow proceeds to a step 208 so as to clear the number of photo-taking frames for the auto-bracketing photo-taking.

The subroutine step 106 shown in FIG. 2 will be explained with reference to the flow chart of FIG. 4. This step is the subroutine to be executed in a case where the film is judged to be a positive film in the step 104 of FIG. 2.

Figure 4:
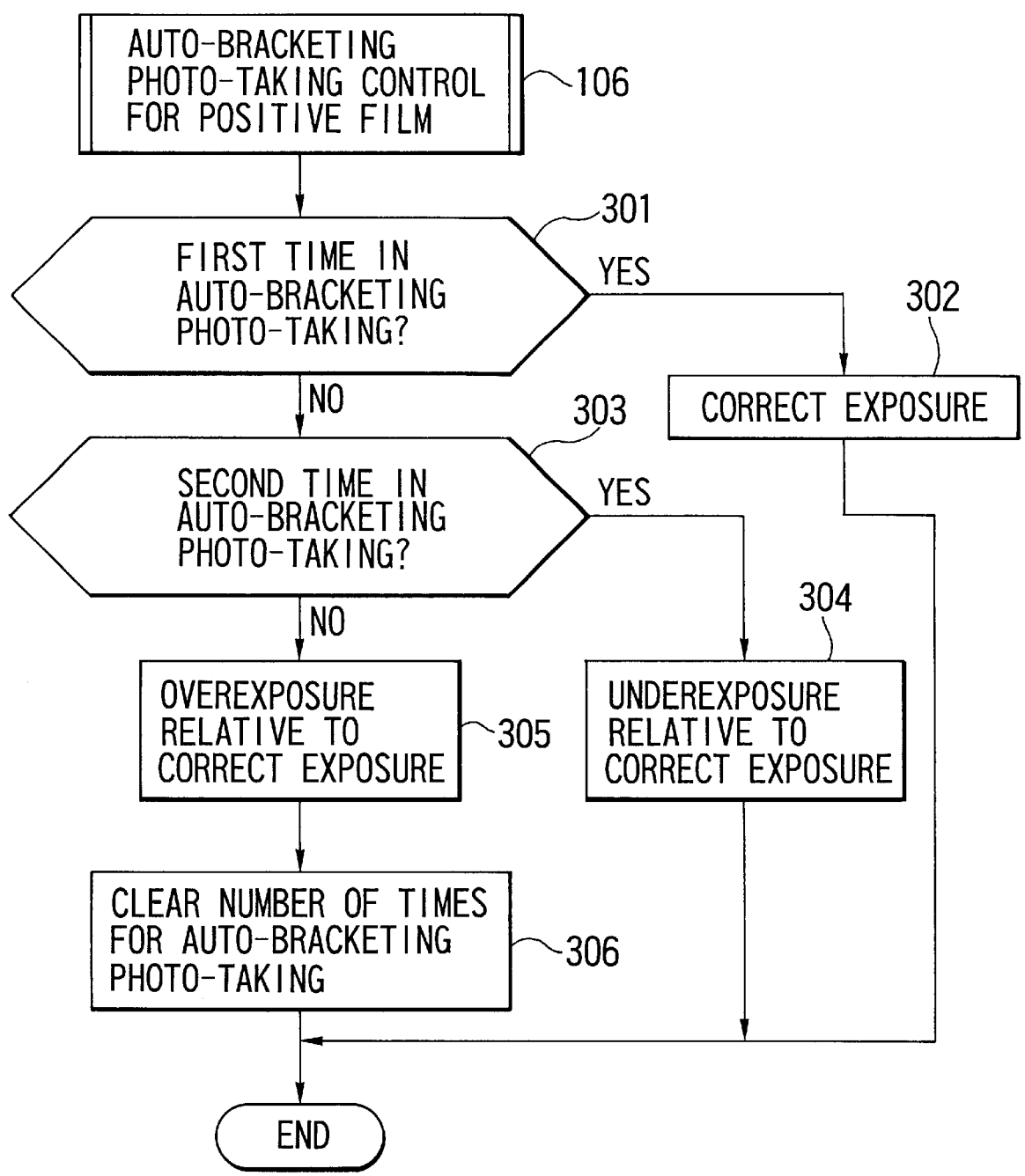
FIG. 4 is a flow chart showing details of the operation executed in a step 106 shown in FIG. 2.

In a step 301 of FIG. 4, whether or not the present frame is the first frame after starting the auto-bracketing photo-taking is judged. If the present frame is the first frame, the flow proceeds to a step 302 so as to set the correct exposure value. If not, the flow proceeds to a step 303, where whether or not the present frame is the second frame after starting the auto-bracketing photo-taking is judged. If the present frame is the second frame, the flow proceeds to a step 304 so as to set an underexposure value according to an exposure shift amount set by the setting of the auto-bracketing photo-taking mode to be later described. Moreover, if, in the step 303, the present frame is judged not to be the second frame after starting the auto-bracketing photo-taking, the flow proceeds to a step 305 so as to set an overexposure value according to the set exposure shift amount. Then, the flow proceeds to a step 306 so as to clear the number of photo-taking frames for the auto-bracketing photo-taking.

With the exposure value set by the subroutine maintained, the flow proceeds to the step 108 of FIG. 2, as mentioned above.

Then, how to set the auto-bracketing photo-taking mode will be explained with reference to the flow chart of FIG. 5.

Figure 5:
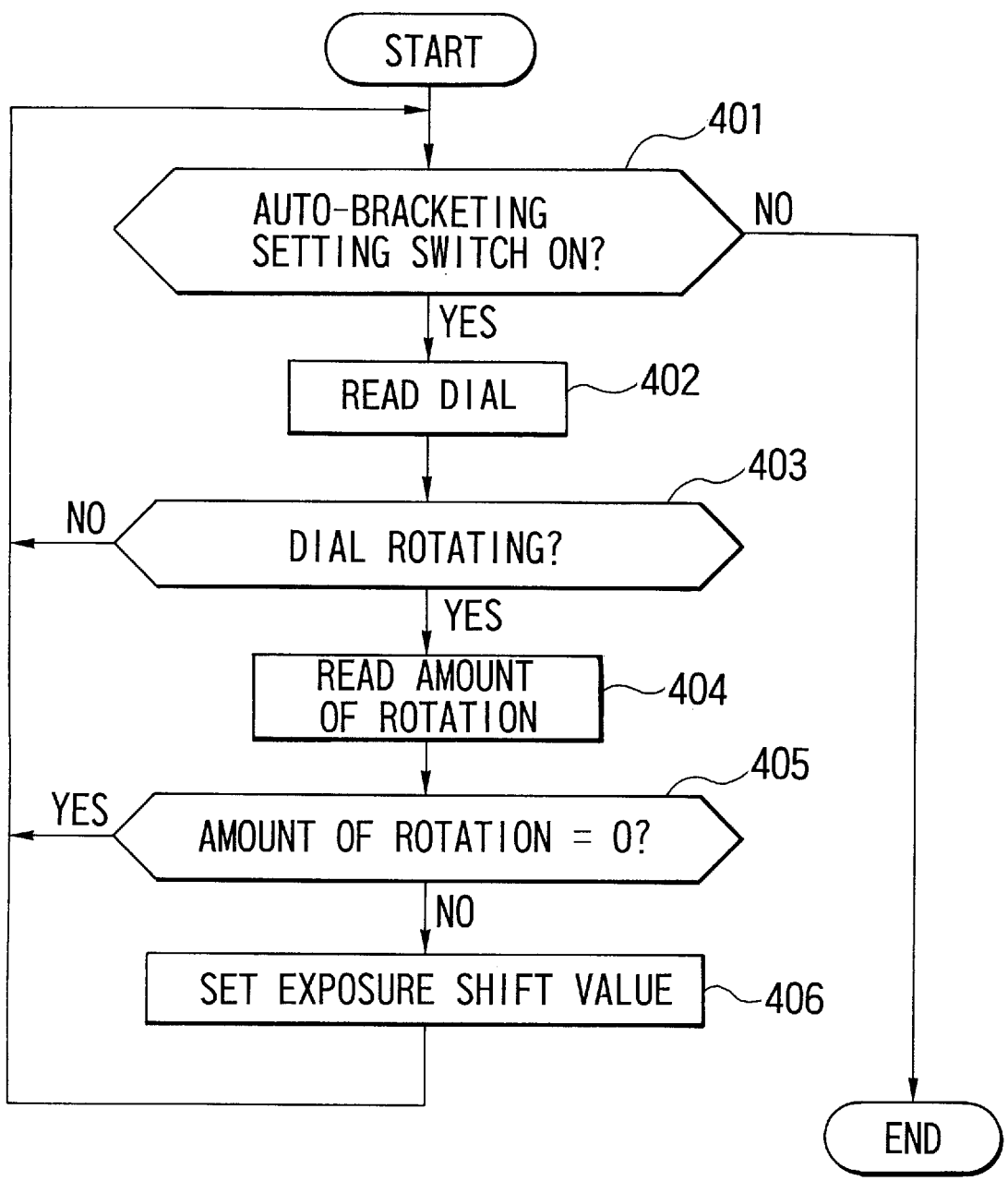
FIG. 5 is a flow chart showing the operation when the auto-bracketing photo-taking mode is set in the camera according to the embodiment of the invention.

In a step 401 of FIG. 5, whether or not the switch BSW is on is judged. If the switch BSW is not on, the setting operation is ended. If the switch BSW is on, the flow proceeds to a step 402 so as to read the setting dial 13 being operated. If, in the next step 403, it is judged that the setting dial 13 is not being rotated, the flow returns to the step 401. On the other hand, if it is judged that the setting dial 13 is being rotated, the flow proceeds to a step 404 so as to read out the amount of rotation of the setting dial 13. In the next step 405, even in a case where it is judged that the setting dial 13 is being rotated, if the result of reading after the rotation of the setting dial 13 has not changed from the result of reading before the rotation thereof, the flow returns to the step 401. If the result of reading after the rotation of the setting dial 13 has changed from the result of reading before the rotation thereof, the flow proceeds to a step 406 so as to store an exposure shift amount corresponding to the amount of rotation of the setting dial 13. Then, the flow returns to the step 401. If the setting is determined, the setting operation is ended by turning off the switch BSW.

As mentioned above, by rotating the setting dial 13 with the switch BSW turned on, the auto-bracketing photo-taking mode can be set or canceled, and the exposure shift amount can be set.

Figure 6:
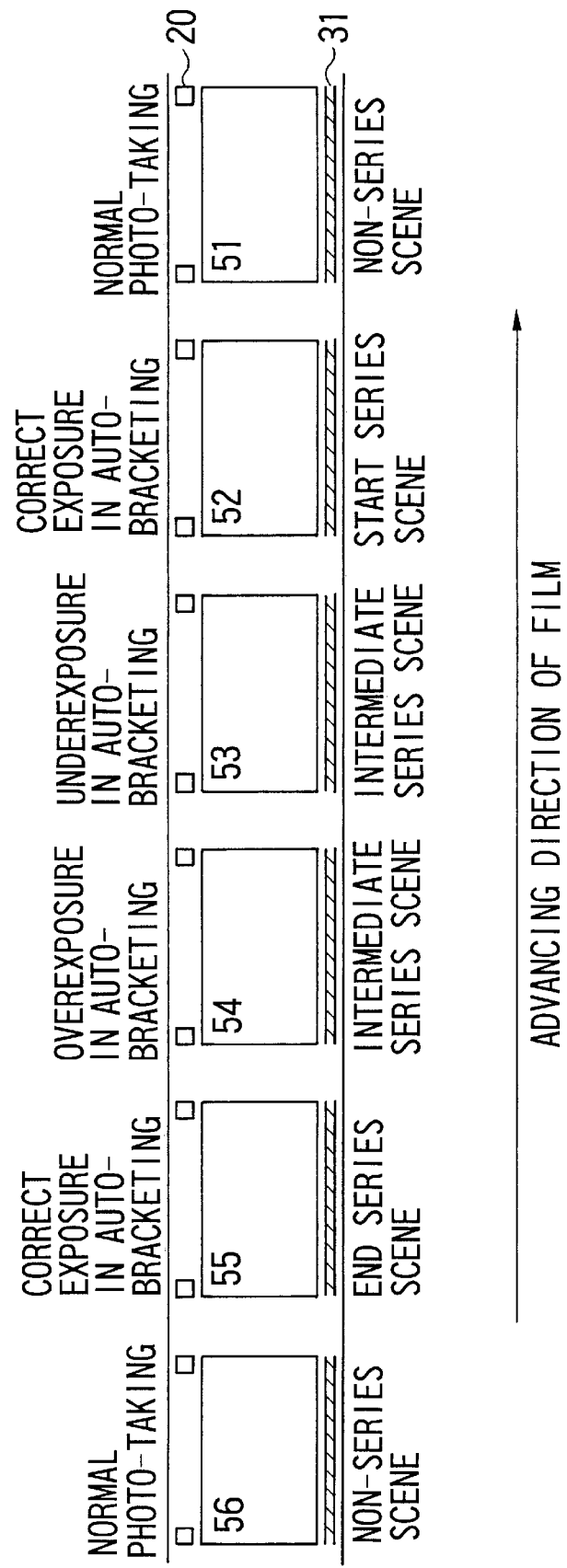
FIG. 6 is a diagram showing the state of the film in the case of photographing in the auto-bracketing photo-taking mode on a negative film by the camera according to the embodiment of the invention.
Figure 7:
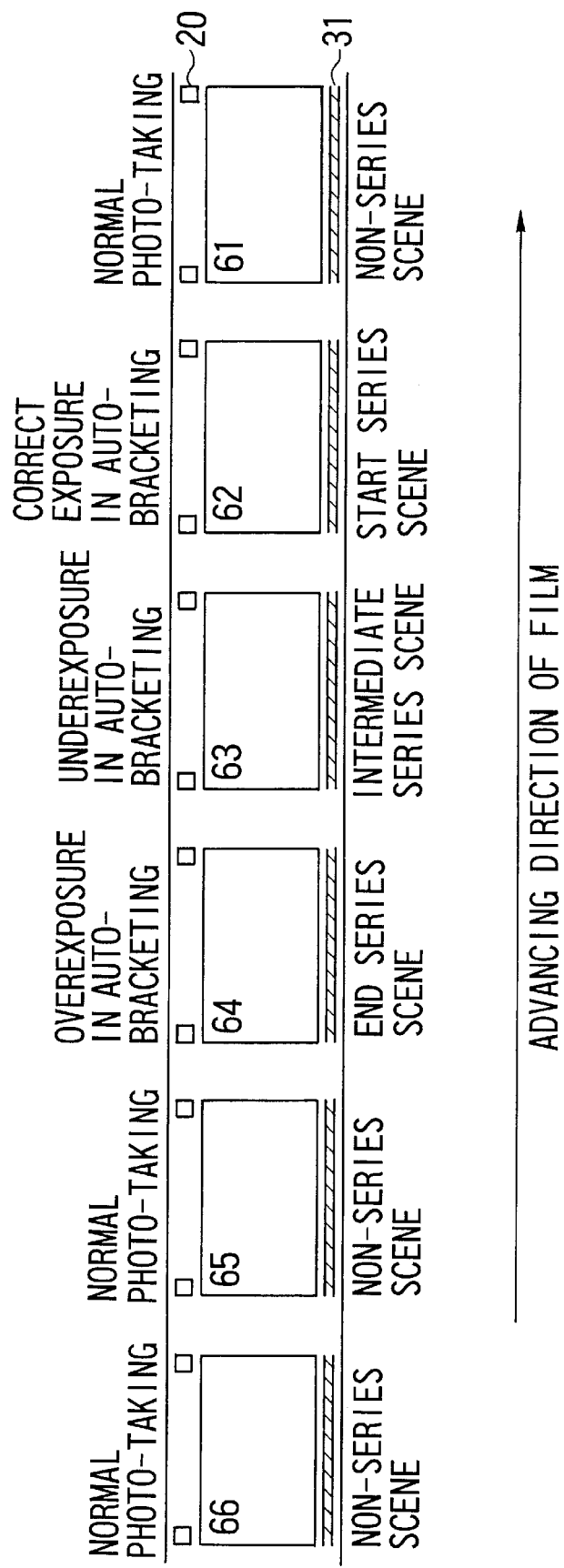
FIG. 7 is a diagram showing the state of the film in the case of photographing in the auto-bracketing photo-taking mode on a positive film by the camera according to the embodiment of the invention.

FIGS. 6 and 7 are diagrams for explaining the information on the series scene according to the auto-bracketing photo-taking, recorded on the film. The information is recorded on the magnetic recording part 31 of the film 20.

FIG. 6 is a diagram showing the photographing state of the film when the auto-bracketing photo-taking is performed with a negative film used as the film.

The normal photo-taking has been executed until the frame 51. From the frame 52, the auto-bracketing photo-taking is started. Since the frame 52 is the first frame after starting the auto-bracketing photo-taking, the frame 52 is taken with the correct exposure, and at the same time, information indicating that this frame is a series-scene start frame is recorded in the magnetic recording part 31. The frame 53 is taken with an underexposure according to the exposure shift amount set by the setting of the auto-bracketing photo-taking mode, and at the same time, information indicating that this frame is a series-scene intermediate frame is recorded in the magnetic recording part 31. Similarly, the frame 54 is taken with an overexposure according to the exposure shift amount set by the setting of the auto-bracketing photo-taking mode, and at the same time, information indicating that this frame is a series-scene intermediate frame is recorded in the magnetic recording part 31. The frame 55 is taken with the correct exposure as the last frame of the auto-bracketing photo-taking, and at the same time, information indicating that this frame is a series-scene end frame is recorded in the magnetic recording part 31. As mentioned above, a series of operations of the auto-bracketing photo-taking is completed after taking the above four frames.

Incidentally, the frame 56 is taken as the normal photo-taking, but in some cases, a further different auto-bracketing photo-taking may be started.

FIG. 7 is a diagram showing the photographing state of the film when the auto-bracketing photo-taking is performed with a positive film used as the film. The normal photo-taking has been executed until the frame 61. From the frame 62, the auto-bracketing photo-taking is started. Since the frame 62 is the first frame after starting the auto-bracketing photo-taking, the frame 62 is taken with the correct exposure, and at the same time, information indicating that this frame is a series-scene start frame is recorded in the magnetic recording part 31. The frame 63 is taken with an underexposure according to the exposure shift amount set by the setting of the auto-bracketing photo-taking mode, and at the same time, information indicating that this frame is a series-scene intermediate frame is recorded in the magnetic recording part 31. The frame 64 is taken with an overexposure according to the setting shift amount as the last frame of the auto-bracket photo-taking, and at the same time, information indicating that this frame is a series-scene end frame is recorded in the magnetic recording part 31. As mentioned above, a series of operations of the auto-bracketing photo-taking is completed after taking the above three frames.

Incidentally, the frame 65 is taken as the normal photo-taking, but in some cases, a further different auto-bracketing photo-taking may be started.

According to the above-mentioned embodiment, in a case where the film used in the auto-bracketing photo-taking is a negative film, since the start frame and the end frame of frames continuously taken have the photo-taking exposure amount unchanged, that is, are made to be frames with the correct exposure (neither the underexposure nor the overexposure), as shown in FIG. 6. Therefore, even in a case where a film taken by the auto-bracketing photo-taking in the order of the correct exposure, the underexposure and the overexposure is printed by an automatic printing photofinishing system for printing in the reverse order, since the start frame is a frame with the correct exposure, the print with the exposure intended by the photographer can always be provided.

Although the information on the film used is read automatically from the data disk in the above-described embodiment, a switch for inputting the information may be provided so as to detect the film information according to the state of the switch.

It is needless to say that the present invention is not limited to the arrangement of the above-described embodiment, but can be embodied in any configuration as long as the functions shown in claims or the functions shown by the embodiment can be realized.

In the above-described embodiment, whether or not the film used in the auto-bracketing photo-taking is a negative film or a positive film is detected at the time of the auto-bracketing photo-taking mode, and if the film is a negative film, the start frame and the end frame of frames continuously taken in the auto-bracketing photo-taking mode are taken with the photo-taking exposure amount unchanged, that is, with the correct exposure (neither the underexposure nor the overexposure), and the series-scene information commanding the print in the same condition so as to accurately reproduce the exposure state at the time the photographs are taken is recorded. However, it is not always necessary to record the series-scene information. For example, in the case of developing by the photographer himself or herself, or entrusting the print to a processing laboratory with the oral instruction not to use the automatic printing photofinishing system, the print with the exposure changed stepwise can also be obtained as intended by the photographer with the configuration that the photo-taking exposure amount unchanged for the start frame and the end frame of a negative film.

Moreover, although the series-scene information is recorded magnetically in the above-mentioned embodiment, the series-scene information may also be recorded optically. Furthermore, although the information is recorded in the magnetic recording part of the film, the information may also be recorded in the film cartridge.

Moreover, although the series-scene information is recorded in each of the auto-bracketing photo-taking frames, it is also possible that at least information of starting and ending the series scene is recorded in the start frame and the end frame of the auto-bracketing photo-taking.

Furthermore, the present invention can be applied to various kinds of cameras such as lens-shutter cameras, single-lens reflex cameras, video cameras, electronic still cameras, or further, to photographing apparatuses adapted for the cameras, or elements constituting the same.

As heretofore mentioned, according to the embodiments of the invention, there are provided a camera and a photographing apparatus capable of giving prints with an exposure changed stepwise as intended by a photographer even in a case where the film used in the auto-bracketing photo-taking mode is a negative film.

Moreover, according to the embodiments of the invention, there are provided a camera and a photographing apparatus capable of giving prints with an exposure changed stepwise as intended by a photographer, regardless of the kind of an automatic printing photofinishing system, even in a case where the film used in the auto-bracketing photo-taking mode is a negative film.

What is claimed is:

1. A camera comprising:
   photo-taking mode setting means for setting one of photo-taking modes of the camera, the photo-taking modes including an auto-bracketing photo-taking mode of photographing on a plurality of frames of a film continuously with a photo-taking exposure value changed automatically and stepwise; and photo-taking control means for, when the auto-bracketing photo-taking mode is set by said photo-taking mode setting means, photographing with a predetermined standard exposure value on both of a start frame and an end frame of a continuous photo-taking in the auto-bracketing photo-taking mode, and photographing with an exposure value different from the predetermined standard exposure value on a frame between the start frame and the end frame.

2. A camera according to claim 1, wherein said photo-taking control means includes means for, when the auto-bracketing photo-taking mode is set, photographing on a frame other than the start frame and the end frame with an underexposure value relative to the standard exposure value.

3. A camera according to claim 1, wherein said photo-taking control means includes means for, when the auto-bracketing photo-taking mode is set, photographing on a frame other than the start frame and the end frame with an overexposure value relative to the standard exposure value.

4. A camera according to claim 1, wherein said photo-taking control means includes means for deciding the standard exposure value in the auto-bracketing photo-taking mode according to a light measurement result obtained by a light measuring circuit.

5. A camera according to claim 1, wherein said photo-taking control means includes means for, when the film used in said camera is a negative film and the auto-bracketing photo-taking mode is set by said photo-taking mode setting means, photographing with a predetermined standard exposure value on both of a start frame and an end frame of a continuous photo-taking in the auto-bracketing photo-taking mode, and photographing with an exposure value different from the predetermined standard exposure value on a frame between the start frame and the end frame.

6. A camera according to claim 1, wherein said photo-taking control means includes means for, when the film used in said camera is a positive film, even if the auto-bracketing photo-taking mode is set by said photo-taking mode setting means, photographing in a manner different from "photographing with a predetermined standard exposure value on both of a start frame and an end frame of a continuous photo-taking in the auto-bracketing photo-taking mode, and photographing with an exposure value different from the predetermined standard exposure value on a frame between the start frame and the end frame".

7. A camera according to claim 6, wherein said photo-taking control means includes means for, when the film used in said camera is a positive film and the auto-bracketing photo-taking mode is set by said photo-taking mode setting means, photographing with a predetermined standard exposure value on one of a start frame and an end frame of a continuous photo-taking in the auto-bracketing photo-taking mode, and photographing with an exposure value different from the predetermined standard exposure value on the other of the start frame and the end frame.

8. A camera according to claim 1, further comprising:

a data recording device for recording, on the film, predetermined data corresponding to each frame of the film, wherein said data recording device records, on the film, information indicating that an exposure condition during printing is to be the same with respect to all frames of the continuous photo-taking in the auto-bracketing photo-taking mode.

9. A camera according to claim 8, wherein said data recording device includes means for performing magnetic recording.

10. A camera according to claim 8, wherein said data recording device includes means for performing optical recording.

* * * * *